United States Patent
Wen et al.

(10) Patent No.: US 8,422,078 B2
(45) Date of Patent: Apr. 16, 2013

(54) METHOD OF PROCESSING NEUTRAL GRAY COLOR PRINT JOBS AS MONOCHROME BLACK DURING BILLING DETECTION AND PRINTING AS A NEUTRAL GRAY COMPOSITE BLACK

(75) Inventors: Zhenhuan Wen, Pittsford, NY (US); Francis K. Tse, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/562,359

(22) Filed: Jul. 31, 2012

(65) Prior Publication Data

US 2012/0293815 A1 Nov. 22, 2012

Related U.S. Application Data

(62) Division of application No. 12/366,268, filed on Feb. 5, 2009, now Pat. No. 8,253,979.

(51) Int. Cl.
*H04N 1/40* (2006.01)

(52) U.S. Cl.
USPC ............................................. 358/2.1; 358/529

(58) Field of Classification Search .................... 358/1.1, 358/1.9, 2.1, 3.23, 462, 500–501, 504, 518, 358/523, 529
See application file for complete search history.

(56) References Cited

U.S. PATENT DOCUMENTS

| | | | |
|---|---|---|---|
| 5,459,678 A | 10/1995 | Feasey | |
| 6,259,536 B1 | 7/2001 | Coleman | |
| 7,154,636 B2 | 12/2006 | Haikin et al. | |
| 7,190,487 B2 | 3/2007 | Dalrymple et al. | |
| 7,847,975 B2 | 12/2010 | Wen | |
| 7,903,285 B2* | 3/2011 | Malik et al. | 358/1.9 |
| 8,064,112 B1 | 11/2011 | Bernasconi | |
| 2009/0009778 A1* | 1/2009 | Wen | 358/1.9 |
| 2010/0195158 A1 | 8/2010 | Wen et al. | |

* cited by examiner

*Primary Examiner* — Thomas D Lee
*Assistant Examiner* — Stephen M Brinich
(74) *Attorney, Agent, or Firm* — Fay Sharpe LLP

(57) ABSTRACT

A method of converting a RIPped K-only page or pixels to composite black in a digital print engine is included which executes the conversion process during current job workflow, while detecting the K-only page or pixels for billing purposes as K-only, and printed out as composite black.

13 Claims, 1 Drawing Sheet

METHOD OF PROCESSING NEUTRAL GRAY COLOR PRINT JOBS AS MONOCHROME BLACK DURING BILLING DETECTION AND PRINTING AS A NEUTRAL GRAY COMPOSITE BLACK

INCORPORATION BY REFERENCE

This application claims the priority, as a divisional, of U.S. application Ser. No. 12/366,268, filed Feb. 5, 2009, by Wen et al., entitled A Method of Processing Neutral Gray Color Print Jobs as Monochrome Black During Billing Detection and Printing as a Neutral gray Composite Black, the disclosure of which is incorporated herein by reference in its entirety.

CROSS REFERENCE TO RELATED PATENTS AND APPLICATIONS

U.S. application Publication No. US 2009-0009778 A1, published Jan. 8, 2009, entitled CONVERTING BLACK TO COMPOSITE BLACK IN DIGITAL PRINTING, disclosure of which is incorporated herein by reference in its entirety.

TECHNICAL FIELD

The presently disclosed embodiments are directed to a digital color printing system.

BACKGROUND

In today's business and scientific world, color has become essential as a component of communication. Color facilitates the sharing of knowledge and ideas. Companies involved in the development of digital color print engines are continuously looking for ways to improve the total image quality of their products. One of the elements that affects image quality is the ability to consistently produce the same quality image output on an imaging device or printer from one day to another, from one week to the next, month after month. There has been a long felt commercial need for efficiently maintaining print color image quality and predictability, particularly as electronic marketing has placed more importance on the accurate representation of merchandise in illustrative print or display media.

Digital color printers are capable of high image quality printing with CMYK toner/ink (C=cyan, M=magenta, Y=yellow and K=black), and regularly detect the processing of the pages as either color (CMYK) or a monochrome (black only), then charge the printed pages at a cost of either a color or a monochrome price accordingly. Customers expect high image quality printing with low cost charging per page, particular for a neutral gray color job. Besides page level color or monochrome detection, a latest marketing push is to have a tiered color billing approach where customers are charged for the amount of color that is present on a page. For example, a customer will expect that a page with all or mostly neutral gray colors (with equal RGB value, R=red, G=green, B=blue) should be charged as monochrome instead of color because it is what they see on the display systems. At the same time, they expect high quality printing. However, certain digital color print engines, such as ink jet and solid ink jet print engines, do not provide an image quality of black ink/toner only printing as good as that of a composite black printing (printed with combinations of CMYK toner/ink). As a practical matter, the color printers either RIP (raster image process) and print neutral gray color job in black only and charge at monochrome price, or RIP and print in composite black and charge at the color price.

Where the overall print job will only involve a page of monochrome black only (K-only) or pages with mostly monochrome black and with very little color content, customers have an expectation that when the page of a print job is totally or mostly monochrome, K only, the cost of that page should be less than the cost of printing a page comprised of a lot of colors, CMYK. As a practical matter, most suppliers of color printers will regularly detect the processing of a color printed job as either a composite color (CMYK) or a monochrome black (K only), and will charge a customer less for printing a page of K-only. In addition, for an input job having all or mostly neutral gray color (R=G=B), customers may view the page as a monochrome gray job, even though it is actually printed a composite gray (C,M,Y,K) and will expect the lower billing rate for that page.

To meet the customer's expectation for color billing, RIP processing workflow in the printer can set the job as "print as K-only" as a default for pixels that are "True Gray" (K-only) or "RGB Neutral Gray" (composite black with equal RGB values), instead of actually printing a composite black for the input color. For this "print as K-only" mode, image quality degradation of tone and color hue match will occur. More particularly, when a job will contain a sweep of K-only or neutral gray color (R=G=B) to near neutral gray color (R=G=B) a mismatch will be more noticeable, since the near neutral gray colors is printed in a composite black while the neutral gray is printed as K-only.

Accordingly, there is a need for a system which can accommodate customer expectations of lower billing for neutral gray color page jobs without suffering image quality degradation to the extent that a customer will view the print system as having an inferior quality print job.

BRIEF SUMMARY

A method and apparatus is provided for processing a color print job comprising detecting a pixel in a job as K-only during job workflow. The RIPped K-only pixel is then converted to a contone composite black (four color per pixel for the CMYK channels), rendered by halftoning or error diffusion, and finally printed out with composite black. The page is billed to a customer based on counting the actual number of real color pixels and not counting the color pixels that were converted from K-only pixels. The converting comprises pixel-based conversion from K-only to contone composite black based on, bit-depth of RIPped bitmap, color mode and resolution of job.

DETAILED DESCRIPTION

The subject embodiments relate to a method and apparatus for adjusting the processing of a print job having neutral gray color pixels to be printed with composite black for enhancing image quality, while detecting the pixel as monochrome for billing purposes. The conversion table that performs the K to CMYK conversion is adjusted such that there is a smooth tonal transition between the near neutral and neutral values.

Accordingly, the system relates to a compromise for customer desires to maintain the lower billing rate for pages that the customer may perceive as a completely or mostly monochrome page to be billed as a black-and-white page, while it is actually printed as a four color plane (CMYK channels) color page to give the customer the benefit of enhanced image quality. Such a processing adjustment is particularly advantageous in jobs that contain sweeps of neutral gray color (R=G=B) to near neutral gray color (R≈G≈B), since a near neutral gray color is normally printed in composite black while a strictly neutral gray is printed as K-only. K-only print jobs can readily be distinguished from near neutral gray in variations in graininess, tone and hue.

Accordingly, the subject method and apparatus provides improved tone in black printing in digital print engines.

Figure 1:
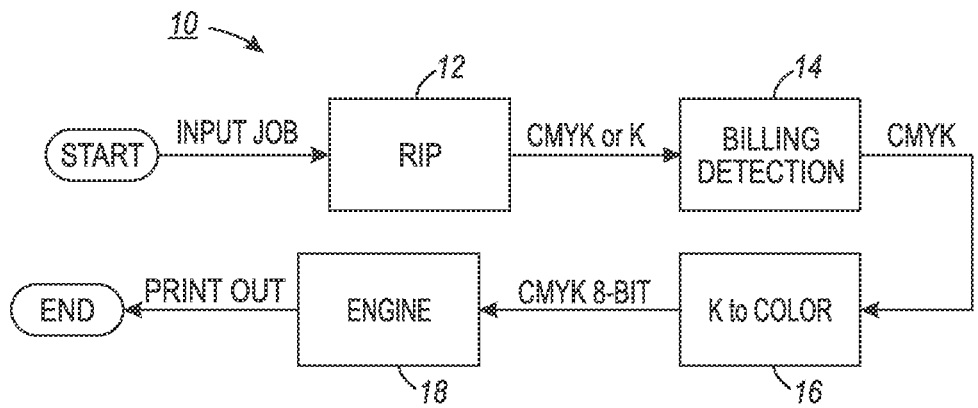
FIG. 1 is schematic block diagram/flow chart of the subject embodiments job workflow.

More particularly, with reference to FIG. 1, the subject embodiments comprise an input job workflow which is common in multi-function products and printers to raster image process (RIP) a color print job in CMYK channels where a pixel can have CMYK values or black only, if the pixel is a neutral gray color. RIP 12 is a well-known, common initial step in print job processing with "print as K-only" feature enabled. After the job has been RIPped as CMYK or K, normal workflow for billing detection involves detecting if each page is a color page (i.e. CMYK channels), or a black-and-white page (K-only channel) per page base. If a page is color, the individual pixels are inspected to determine the total number of color pixels to charge the customer according to its color content.

As noted above, conventional printers will charge different rates depending upon whether the printed page is black-and-white or color with black-and-white pages being charged less. Often times customers will mistakenly view a neutral gray color page of RGB color with R=G=B which looks like a monochrome page on the display screen as a gray page which should be billed as a K-only page. In addition, if the page consists of the four CMYK channels, the pixels on the page will be examined and only color pixels counted for color billing. Billing detection 14 will distinguish between a K-only pixel and a color pixel so that a customer will be billed for the lower rate based on the number of pixels that are not K-only and a neutral gray color.

To enhance image quality, the subject embodiment includes a K-to-color conversion step 16 after the billing detection step 14 during current job workflow. Conversion step 16 performs pixel-based conversion for a RIPped bitmap from non-8 bit data to 8-bit (contone) first, then pixel-based conversion from contone K-only to contone composite black through K-only to composite black table based on color mode and resolution of job. By adjusting the K-only to composite black table, tone and hue of composite black rendered from pure K neutral and is seamlessly matched to a near neutral gray color. Engine 18 will support the required halftoning and/or error diffusion for printing. Accordingly, the workflow program of FIG. 1 provides correctable consumer perceived billing, without introducing image quality degradation.

Figure 2:
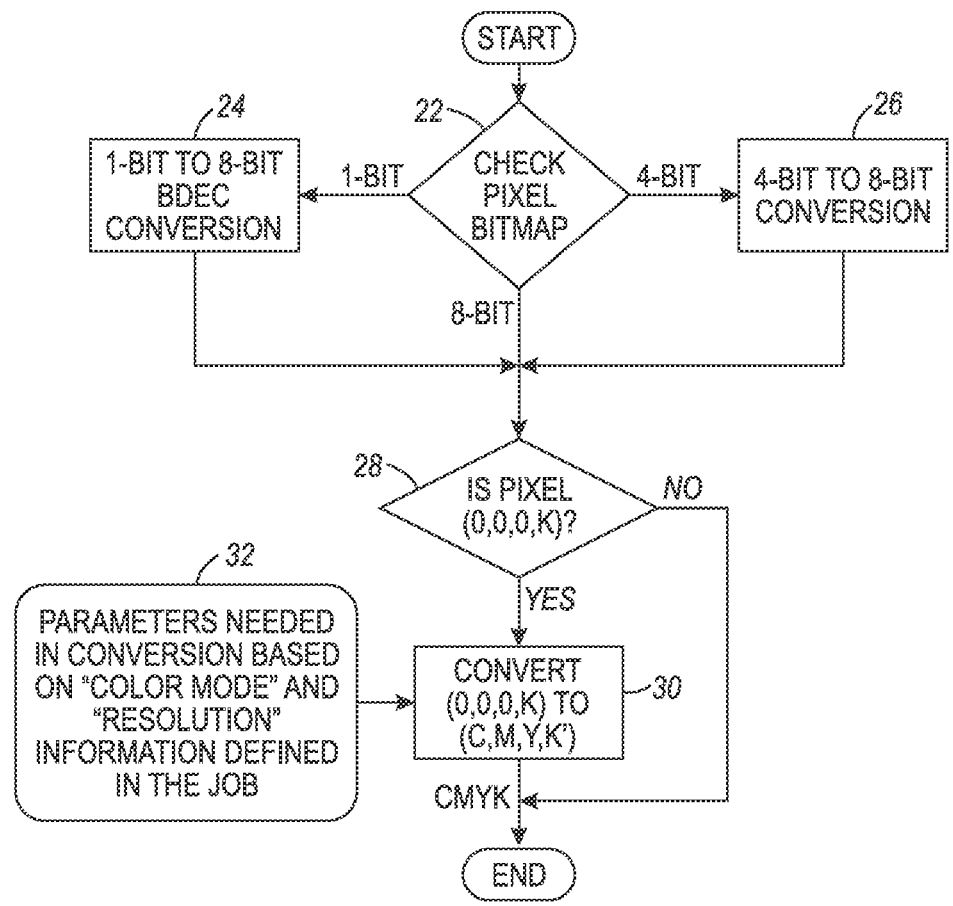
FIG. 2 is a detailed flow diagram of the K to color conversion step of FIG. 1.

With particular reference to FIG. 2, the workflow for the K-to-color step 16 is more particularly shown. The input pixel bitmap form the RIP processing is checked to determine whether it is a 1-bit binary data extended to contone 24 or a 4-bit contone 26 because it is desired that the conversion step comprise an 8-bit signal (contone). After converting or confirming that the signal is 8 bits, the pixel is checked to see if it is K-only (0,0,0,K). If so, then the (0, 0, 0, K) is converted to a composite black (C,M,Y,K') based upon the conversion process disclosed in the U.S. application Publication No. US 2009-0009778 A1, disclosure of which is incorporated herein by reference in its entirety, and the parameters 32 required for such conversion are detailed therein.

The present embodiments comprise a unique method for converting monochromatic black printing to composite black during an image path job workflow.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The word "printer" as used herein encompasses any apparatus such as a digital copier, bookmaking machine, facsimile machine, multi-function machine, etc. which performs a print outputting function for any purpose.

The claims can encompass embodiments in hardware, software or a combination thereof.

What is claimed is:

1. A color print job processing method, the method comprising:
   detecting a pixel in a job as a K-only pixel during job workflow;
   converting the K-only pixel to a contone composite black based on color mode and resolution of job;
   printing the K-only pixel as the contone composite black;
   counting a total number of color pixels in the job; and,
   billing the job based on the total number of color pixels counted.

2. A printing apparatus including a processor, the processor adapted to:
   for each color page in a RiPped print job, determine a total number of pixels that are not one of K-only and neutral gray;
   convert the K-only and neutral gray pixels to contone composite black during job workflow by smoothing tonal transition between near neutral gray and neutral gray values using a table based on color mode and resolution;
   charge the each page for color content using the total number of pixels that are not the one of K-only and neutral gray; and,
   render the print job.

3. The printing apparatus of claim 2, wherein the apparatus is selected from a group consisting of:
   a xerographic printer;
   an inkjet printer;
   a solid inkjet printer;
   a digital printing machine; and,
   a combination of the above.

4. The printing apparatus of claim 2, wherein the processor is further adapted to:
   determine whether an input pixel bitmap of the RiPped print job is a 1-bit signal converted to an 8-bit signal or a 4-bit signal; and, for a 4-bit signal, convert the 4-bit signal to an 8-bit signal.

5. The printing apparatus of claim 4, wherein the processor is further adapted to convert the at least one K-only and neutral gray pixels to contone composite black by matching tone and hue of the K-only and neutral gray pixels to the tone and hue of near neutral gray color.

6. The printing apparatus of claim 4, wherein the processor is adapted to perform the matching by adjusting the K using a table based on color mode and resolution.

7. A color print job processing method, the method comprising:

for a page in a color print job, determining whether each pixel has CMYK values or a K-only value;

counting a total number of pixels that have the CMYK values;

converting the each pixel having the K-only value to contone composite black during job workflow by matching a tone and hue of K-only pixels to a tone and hue of near neutral gray color, the matching including:

adjusting the K-only value using a table based on color mode and resolution;

billing the page for color content using the total number of pixels; and, rendering pixels of the page based on the CMYK values and composite black values.

8. The method of claim 7, further comprising:

determining whether an input pixel bitmap of the RIPped print job is a 1-bit signal converted to an 8-bit signal or a 4-bit signal; and, for a 4-bit signal, converting the 4-bit signal to an 8-bit signal.

9. The method of claim 7, further comprising:

detecting one of a complete and neutral gray pixel as having the K-only value.

10. The method of claim 9, wherein the converting includes:

smoothing tonal transition between near neutral gray and neutral gray values using a table based on color mode and resolution.

11. The method of claim 7, further comprising:

before the determining, acquiring a RIPped page in a color print job.

12. A digital printing machine including a processor for performing the method of claim 7.

13. The method of claim 7, wherein the converting includes:

converting raster image processed image bitmap to contone data.

* * * * *